United States Patent [19]

Shiohara et al.

[11] 4,052,350
[45] Oct. 4, 1977

[54] CHLORINE-CONTAINING RESIN COMPOSITION

[75] Inventors: Tomoo Shiohara; Minoru Kohara, both of Kyoto; Hiroshi Miyoshi, Takatsuki, all of Japan

[73] Assignee: Sekisui Kagaku Kogyo Kabushiki Kaisha, Osaka, Japan

[21] Appl. No.: 636,199

[22] Filed: Nov. 28, 1975

[30] Foreign Application Priority Data

Apr. 11, 1975  Japan ................................ 50-44436
Sept. 19, 1975  Japan ................................ 50-113914
Nov. 27, 1974  Japan ................................ 49-137509

[51] Int. Cl.$^2$ ............................................. C08K 3/34
[52] U.S. Cl. ......................... 260/23 XA; 260/42.14; 260/42.15; 260/42.49; 260/45.7 R; 260/45.75 F; 260/45.75 R; 260/45.75 K
[58] Field of Search ............ 260/42.14, 42.15, 45.7 R, 260/45.75 F, 45.75 R, 45.75 K, 23 XA, 42.49; 106/308 B, 308 Q, 306; 427/218, 219, 220

[56] References Cited

U.S. PATENT DOCUMENTS

| 2,179,973 | 11/1939 | Alexander | 260/45.7 R |
|---|---|---|---|
| 3,272,772 | 9/1966 | Russell | 106/306 |
| 3,461,094 | 8/1969 | Wesch | 260/42.15 |
| 3,471,439 | 10/1969 | Bixler et al. | 260/42.15 |
| 3,474,048 | 10/1969 | Chappelear et al. | 260/42.15 |
| 3,488,319 | 1/1970 | Miller | 260/42.15 |
| 3,519,593 | 7/1970 | Bolger | 260/42.14 |
| 3,904,787 | 9/1975 | Trebinger et al. | 260/42.15 |
| 3,909,285 | 9/1975 | Maurice et al. | 106/306 |

OTHER PUBLICATIONS

Handbook of Physics and Chemistry–40th edition, 1959, Chemical Rubber Pub. Co., Ohio pp. 554 and 555.
British Plastics–June 1954, pp. 213-217.
Modern Plastics–Dec. 1949, pp. 111, 112, 114, 116, 156-162.

*Primary Examiner*—V.P. Hoke
*Attorney, Agent, or Firm*—Sughrue, Rothwell, Mion, Zinn and Macpeak

[57] ABSTRACT

A chlorine-containing resin composition comprising a chlorine-containing resin and at least one calcium compound selected from the group consisting of $2CaO.SiO_2$, $3CaO.SiO_2$, $3CaO.2SiO_2$, the above enumerated compound(s) having coated thereon an organic silicon compound, $CaO.TiO_2$, $2CaO.TiO_2$, $3CaO.TiO_2$, $CaO.Al_2O_3$, $2CaO.Al_2O_3$, $3CaO.Al_2O_3$, $CaAl_2O_4$, $CaB_2O_6$, $Ca_7MgAl_{10}O_{23}$, $CaNb_2O_6$, $CaTa_2O_6$, $CaTiO_3$, $CaZrO_3$ and $CaZrTi_2O_7$. The chlorine-containing resin composition may further comprise an organic acid salt and/or an organic tin compound.

17 Claims, No Drawings

CHLORINE-CONTAINING RESIN COMPOSITION

BACKGROUND OF THE INVENTION

1. Field of the Invention

This invention relates to a chlorine-containing resin composition which is non-toxic or of low toxicity and which has excellent thermal stability for long periods of time.

2. Description of the Prior Art

It is necessary to incorporate a thermal stabilizer into chlorine-containing resins upon processing. The main thermal stabilizers which have been conventionally used for stabilizing chlorine-containing resins include inorganic acid salts, organic acid salts, organic tin compounds and the like and, particularly among these conventional stabilizers, lead salts and lead soaps are widely employed due to their excellent thermal resistance effects and low cost.

Many of these stabilizers are toxic, e.g., those containing lead, and accordingly their utility is limited. On the other hand, calcium-containing stabilizers have recently come into popular use as a non-toxic or of low toxicity stabilizer. The calcium-containing stabilizers include calcium hydroxide, calcium carbonate and the like. However, although calcium hydroxide has a high ability to scavenge free hydrogen chloride which is evolved during the thermal decomposition of the chlorine-containing resins, hydrogen chloride is also taken out from the resin molecules upon molding due to the high basicity of the calcium hydroxide, accelerating deterioration and coloring the resins. Further, in the case of using calcium carbonate as a stabilizer, since its ability to scavenge hydrogen chloride is weak, free hydrogen chloride which is evolved during the decomposition of the chlorine-containing resins is not sufficiently scavenged, thereby accelerating decomposition and coloring of the chlorine-containing resins.

SUMMARY OF THE INVENTION

As a result of extensive investigations conducted by the inventors to eliminate the above described disadvantages associated with the conventional stabilizers, the inventors discovered a chlorine-containing resin composition which is non-toxic or of low toxicity and which is also excellent in thermal stability for prolonged periods of time, thereby reaching the present invention.

The present invention provides a chlorine-containing resin composition which comprises a chlorine-containing resin and at least one calcium compound selected from the group consisting of $2CaO.SiO_2$, $3CaO.SiO_2$, $3CaO.2SiO_2$, the above enumerated compound(s) having coated thereon an organic silicon compound, $CaO.TiO_2$, $2CaO.TiO_2$, $3CaO.TiO_2$, $CaO.Al_2O_3$, $2CaO.Al_2O_3$, $3CaO.Al_2O_3$, $CaAl_2O_4$, $CaB_2O_6$, $Ca_7MgAl_{10}O_{23}$, $CaNb_2O_6$, $CaTa_2O_6$, $CaTiO_3$, $CaZrO_3$ and $CaZrTi_2O_7$, and optionally an organic acid salt and/or an organic tin compound.

DETAILED DESCRIPTION OF THE INVENTION

Examples of chlorine-containing resins which can be used in this invention include, for example, polyvinyl chloride, polyvinylidene chloride, a vinyl chloride-vinylidene chloride copolymer having a vinyl chloride content of about 5 to about 95% by weight; a vinyl chloride-vinyl acetate copolymer, most generally commercially available with a vinyl acetate content of 0.4 to 40 wt%, more often 0.5 to 20 wt%; a vinyl chloride-ethylene copolymer, most generally commercially available with an ethylene content of 1 to 15 mole% and an average degree of polymerization of 700 to 1500; chlorinated vinyl chloride, most generally commercially available with a chlorine content of 60 to 70 wt%, more often 63 to 68 wt%; and chlorinated polyethylene, most generally commercially available with a chlorine content of 25 to 45%. These materials undergo thermal decomposition during molding, and require stabilizers to prevent such thermal decomposition.

$2CaO.SiO_2$, $3CaO.SiO_2$ and $3CaO.2SiO_2$ (hereafter often generally referred to as calcium silicate compounds) which are used in this invention are of the same in quality as those used in the cement and ceramic industries. These calcium silicate compounds are of low activity, i.e., they have a low ability as an anhydrated calcium silicate compound to take up a molecule of water to form a hydrate (the higher the activity, the higher the number of water molecules present in the hydrated form), generally having an anhydride structure with the bonding ratio of calcium oxide:silicic acid being 2:1, 3:1 and 3:2, respectively. These compounds are generally described in H. F. W. Taylor, Chemistry of Cement, Vols. I & II, published by Academic Press Co., London/New York, 1964, and can be obtained by a dry synthesis method such as a calcination or melting method which is well-known in the art. When they are incorporated into chlorine-containing resins, they show a behavior entirely different from that of highly active calcium silicate compounds, i.e., those containing a high water content (hydrate structure) with the bonding rato of calcium oxide:silicic acid being about 1:1, which can be obtained by a wet synthesis method, for example, Tobermolite ($CaO.SiO_2.H_2O$), Xonotrite ($5CaO.6SiO_2.5-9H_2O$) and the like. Accordingly, excellent thermal stability can be obtained for the first time with chlorine-containing resins by using the above described calcium silicate compounds of low activity.

These calcium silicate compounds as well as the other calcium compounds, which are hereinafter described in detail, can have any particle size, but are preferably used as a fine powder on the order of the size of generally used inorganic additives in the synthetic resin art. Although not desiring to be bound, fine particles of the compounds having a particle size of less than about 60 mesh, preferably less than 200 mesh, are advantageously used in the present invention.

The organic silicon compounds which can be used for coating the surface of $2CaO.SiO_2$, $3CaO.SiO_2$ and $3CaO.2SiO_2$ include compounds represented by the formula $RSiX_3$ wherein R represents a group containing a functional group such as a vinyl group, a methacryloxy group, an amino group, a mercapto group, a glycidoxy group

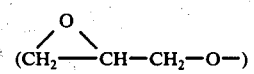

or a haloalkyl group having 1 to 5 carbon atoms such as chloroalkyl groups, for example, a vinyl group, a methacryloxypropyl group, an aminoalkyl group in which the alkyl moiety can be straight or branched chain, the alkyl group having 2 to 4 carbon atoms, a mercaptopropyl, or a chloropropyl group, and X represents a halogen atom such as chlorine, bromine, fluorine or iodine, an alkoxy group having 1 to 2 carbon atoms such as a methoxy group or an ethoxy group, or an acetoxy group. Representative examples of the organic silicon compounds are γ-mercaptopropyl trimethoxysilane, γ-glycidoxypropyl trimethoxysilane, γ-aminopropyl trimethoxysilane, γ-methacryloxypropyl trimethoxysilane and the like.

As previously described, the calcium silicon compounds used in the present invention can be coated on their outer surface with an organic silicon compound as set forth above. The term "coating" used herein refers to reacting the outer surface of the calcium silicate compound with an organic silicon compound to obtain the calcium silicate compounds having molecules of the organic silicon compound on the surface of the calcium silicate compounds, generally in a whisker-like form.

The process for coating the outer surface of the calcium silicate compounds with the above described organic silicon compound is, for example, as follows. That is, calcium silicate compounds are dispersed or suspended in water or an organic solvent containing a trace amount of water. Representative examples of the organic solvent used are hydrocarbons such as n-hexane, benzene, xylene and the like, chlorinated hydrocarbons such as chloroform, carbon tetrachloride, dichloroethane and the like, alcohols such as methanol, ethanol, propanol and the like, ethers such as diethyl ether, tetrahydrofuran and the like, and ketones such as acetone, methyl ethyl ketone, diethyl ketone and the like. These organic solvents generally contain a trace amount of water. For example, even with highly pure grades of such reagents, about 0.05% by weight of water (maximum) is present in hydrocarbon and chlorinated hydrocarbon solvents, about 0.2 to 5% by weight of water is present in alcohols, about 0.2 to 0.8% by weight of water is present in ketone or ether solvents. The water present functions as a catalyst in the reaction of the calcium silicate compound with the organic silicon compound. As will be apparent to one skilled in the art, the presence and the amount of water in the organic solvent is optional since the moisture content in air also serves as a catalyst when a mixture of the calcium silicate compound and the organic silicon compound is allowed to stand in the open air. Theoretically, the amount of water required for the reaction can be calculated from the amount of the organic silicon compound used, i.e., at least one mole of water is required for the formation of a silanol group (Si-OH), with the maximum amount of water required being 3 moles, per mole of the organic silicon compound. However, water can be present in any excess amount over three moles per mole of the organic silicon compound. An appropriate amount of the organic silicon compound generally ranging from about 0.5 to about 6 parts by weight per 100 parts of the calcium silicate compound is added to the suspension, and the resulting mixture is heated with stirring for a given time, whereby the outer surface of the calcium silicate compounds is reacted with the organic silicon compound followed by filtration and drying. The temperature for heating and the time required for the reaction, i.e., the formation of the silanol group (Si-OH) by hydrolysis, vary depending upon the boiling point of the solvent used. For example, when methanol is used as the solvent, the organic silicon compound is completely hydrolyzed at a temperature of 70° C for about 4 to 5 hours. In diethyl ether, or chloroform, heating at a temperature of about 40° C for about 7 to 8 hours is generally sufficient, and in xylene, heating at a temperature of from about 135° C to about 145° C for about 30 minutes to about 1 hour is generally sufficient. Generally, heating at a temperature less than about 160° C for about 30 minutes to about 8 hours will be sufficient. Alternatively, the calcium silicate compound and the organic silicon compound can be blended at a ratio of from about 0.5 to about 6 parts by weight per 100 parts of the calcium silicate compound (depending upon the surface area of the calcium silicate compound; higher surface areas use more and lower surface areas use less) using a ball-mill, a Henschel mixer and the like, and heated at a temperature of about 100° C to about 160° C for about 3 to 5 minutes to allow the mixture to react. In the thus obtained stabilizer, the $SiO_2$ component present in the calcium silicate compounds and the silanol group (Si-OH) formed by the hydrolysis of the halogen or the alkoxy group of the organic silicon compound are reacted to form an Si-O-Si bond, thereby activating the outer surface of the calcium silicate compounds. An improved ability to scavenge hydrogen chloride over a stabilizer comprising calcium silicate alone is believed to be brought about by the above described mechanism.

The other calcium compounds, i.e., $CaO.TiO_2$, $2CaO.TiO_2$, $3CaO.TiO_2$, $CaO.Al_2O_3$, $2CaO.Al_2O_3$, $3CaO.Al_2O_3$, $CaAl_2O_4$, $CaB_2O_6$, $Ca_7MgAl_{10}O_{23}$, $CaNb_2O_6$, $CaTa_2O_6$, $CaTiO_3$, $CaZrO_3$ and $CaZrTi_2O_7$, which can be used in the present invention can easily be obtained by mixing the oxide, hydroxide, carbonate, etc., of each of the constituent elements, melt-baking the resulting mixture in a conventional manner using an electric furnace or the like, followed by cooling and then pulverization. These compounds are generally obtained in the form of a complex salt or a calcined product. Hydrates of the above enumerated compounds can also be employed in this invention, and the hydrates can be obtained by a hydrothermal reaction using an autoclave or the like or the hydration of the corresponding anhydrides in a conventional manner.

Particularly preferred calcium compounds other than the previously described calcium silicon compounds are those containing titanium or aluminum such as $CaO.TiO_2$, $2CaO.TiO_2$, $3CaO.TiO_2$, $CaO.Al_2O_3$, $2CaO.Al_2O_3$, $3CaO.Al_2O_3$ and $CaAl_2O_4$.

The organic acid salts which can be suitably used in this invention are salts of lithium, sodium, magnesium, calcium, strontium, barium and aluminum formed with monocarboxylic acids having 2 to 22 carbon atoms, e.g., acetic acid, caproic acid, pelargonic acid, lauric acid, palmitic acid, oleic acid, stearic acid, acrylic acid, methacrylic acid, ricinolic acid, etc.; dicarboxylic acid monoalkyl esters having 3 to 22 carbon atoms, in which the alkyl moiety thereof has 1 to 4 carbon atoms, e.g., esters of oxalic acid, malonic acid, succinic acid, glutaric acid, adipic acid, pimelic acid, suberic acid, azelaic acid, sebacic acid, etc.; unsaturated dicarboxylic acid monoalkyl esters having 10 to 22 carbon atoms, in which the alkyl moiety thereof has 1 to 4 carbon atoms, e.g., esters of maleic acid, fumaric acid, citraconic acid, mesaconic acid, itaconic acid, aconitic acid, etc.; monoaromatic monocarboxylic acids, e.g., benzoic acid, salicylic acid, etc.; monoaromatic dicarboxylic acid monoalkyl esters having 10 to 22 carbon atoms, in which the alkyl moiety thereof has 1 to 4 carbon atoms, e.g., esters of phthalic acid, terephthalic acid, etc.; and thiocarboxylic acids, e.g., thioglycolic acid, mercaptolactic acid, mercaptopropionic acid, etc. In particular, when non-toxicity is strictly required, it is preferred to use the sodium, magnesium or calcium salts of propionic acid, 2-ethylhexoic acid, 12-hydroxystearic acid, gluconic acid, sorbic acid, glycerolic acid, rosic acid, benzoic acid, higher fatty acids such as beef tallow hardened fatty acids, fish oil hardened fatty acids and oxy fatty acids, in which the fatty acid has 8 to 32 carbon atoms, and mixtures thereof. The most preferred organic acid salt is calcium stearate.

The preferred organic tin compounds which can be used in this invention are those containing organic groups such as aryl or alkyl groups, with preferred carbon atoms in each group being 9 or less, including dibutyl tin laurate, dibutyl tin distearate, dibutyl tin dinonylate, tribenzyl tin laurate, dibutyl tin maleate, dioctyl tin maleate polymer, dioctyl tin maleate, dioctyl tin laurate and dioctyl tin bis-(2-ethylhexylthioglycolic acid ester mercaptide). When strict non-toxicity is required, dioctyl tin maleate polymer and dioctyl tin bis-thioglycolic acid ester mercaptide are particularly preferred.

In the present invention, the calcium compound (i.e., the calcium silicate compound with or without coating with an organic silicon compound(s), and/or other calcium compounds, hereinafter the same) is preferably used in an amount ranging from about 0.5 to about 20 parts by weight per 100 parts by weight of the chlorine-containing resin. If the calcium compound is used in combination with the organic acid salt, about 0.5 to about 20 parts by weight of the calcium compound and less than about 5 parts by weight of the organic acid salt are preferably used per 100 parts by weight of the chlorine-containing resin. Further, if a three component system comprising the calcium compound, the organic acid salt and the organic tin compound is employed as a stabilizer, about 0.5 to about 20 parts by weight of the calcium silicate compound, less than about 5 parts by weight of the organic acid salt and less than about 3 parts by weight of the organic tin compound are preferably used per 100 parts by weight of the chlorine-containing resin. However, the amounts of the stabilizers added to the chlorine-containing resin are not particularly limited to the above recited ranges, and if desired, other conventional stabilizers, fillers, pigments, lubricants and the like can appropriately be added to the resin without adversely affecting the same.

Accordingly, by adding to a chlorine-containing resin one or more calcium compounds selected from the group consisting of $2Ca.SiO_2$, $3CaO.SiO_2$, $3Ca.2SiO_2$, the above enumerated compound(s) having coated thereon an organic silicon compound, $CaO.TiO_2$, $2CaO.TiO_2$, $3CaO.TiO_2$, $CaO.Al_2O_3$, $2CaO.Al_2O_3$, $3CaO.Al_2O_3$, $CaAl_2O_4$, $CaB_2O_6$, $Ca_7MgAl_{10}O_{23}$, $CaNb_2O_6$, $CaTa_2O_6$, $CaTiO_3$, $CaZrO_3$ and $CaZrTi_2O_7$ hydrogen chloride which is generated during the thermal decomposition of chlorine-containing resins upon molding can effectively be scavenged, but hydrogen chloride is not positively taken out from the molecules of the chlorine-containing resins, whereby thermal stability for prolonged periods of time and the anti-coloring property of the resulting resin composition can be retained. The use of the above described calcium compound in combination with an organic acid salt remarkably improves the anti-coloring property and the workability of the resulting resin composition, and the use of the calcium compound in combination with the organic acid salt and/or the organic tin compound further improves these properties.

In addition, since the chlorine-containing resin compositions according to the present invention contain the above described calcium compound, the calcium compound is free from secondary aggregation when the resin composition is molded by extrusion or roll-mixing, the shearing force caused by the roll-mixing fractures the crystalline form of the calcium compound, thereby increasing the dispersibility of the calcium compound(s) in the chlorine-containing resin powder to a finer particle size. This phenomenon can be observed by an electron microscope, and brings about a favorable result in terms of the physical properties of the end products.

The present invention will now be illustrated in greater detail with reference to several Examples, but they are given for illustrative purposes only and are not to be construed as limiting the invention. In the Examples, all processings were conducted at room temperature, atmospheric pressure, and all percentages, parts and ratios are by weight, and the particle size of the calcium compound was less than 60 mesh, unless otherwise indicated.

EXAMPLES 1 to 3

Each of $2CaO.SiO_2$, $3CaO.SiO_2$ and $3CaO.2SiO_2$ was added to a polyvinyl chloride resin having an average degree of polymerization of 1100 (hereinafter the same) in an amount of 2, 5 or 10 parts by weight per 100 parts by weight of the resin, and each of the resulting mixtures was uniformly blended at a temperature of 100° C to 160° C for 3 to 5 minutes. A prescribed amount of the blended powder was taken up so as to contain 2 g of the polyvinyl chloride and pyrolyzed at 200° C in an oil bath using a conventional resin thermal decomposition apparatus for a period of time as indicated in Table 1 below. Hydrogen chloride generated from the resin present in the system was purged using nitrogen gas as a carrier gas and then dissolved in water, and the amount of free hydrogen chloride measured. Further, the residual mixture of resin and calcium chloride formed during the pyrolysis by reaction between CaO and HCl generated from polyvinyl chloride resin was swollen in dichloroethane, and water was added thereto followed by shaking to extract all chlorides. Each of the resulting solutions was titrated with a 1N aqueous solution of silver nitrate as a titrant by a potentiometric titration method. The amount of the hydrogen chloride in the purged gas was quantitiatively determined (which is referred to as free hydrogen chloride) and then the amount of the extracted hydrogen chloride present in the residual mixture which was scavenged by the stabilizer was determined (which is referred to as extracted hydrogen chloride). The amount of the above determined free hydrogen chloride and the amount of the extracted hydrogen chloride were combined to give the total amount of the hydrogen chloride generated from the polyvinyl chloride resin. The results obtained are shown in Table 1 below.

For comparison, the results obtained by using the polyvinyl chloride alone or in combination with calcium hydroxide, calcium carbonate or calcium silicate hydrate are shown in Table 2 below as Comparative Examples 1 to 4.

Table 1

| Example No. | Stabilizer | Amount of Stabilizer per 100 parts of PVC (Part) | Thermal Decomp. Time (min.) | Free HCl | Extracted HCl | Total Amount of HCl |
| --- | --- | --- | --- | --- | --- | --- |
|  |  |  |  | ($\times 10^{-2}$ mmol) | | |
| 1-a | $2CaO \cdot SiO_2$ | 2 | 30 | 0.30 | 12.76 | 13.06 |
| b | " | 5 | 30 | 0.10 | 10.91 | 11.01 |
| c | " | 10 | 30 | 0.09 | 10.28 | 10.37 |
| d | " | 2 | 60 | 0.87 | 33.33 | 34.20 |
| e | " | 5 | 60 | 0.75 | 31.13 | 31.88 |
| f | " | 10 | 60 | 0.10 | 24.61 | 24.71 |
| 2-a | $3CaO \cdot SiO_2$ | 2 | 30 | 0.27 | 11.63 | 11.90 |
| b | " | 5 | 30 | 0.30 | 13.15 | 13.45 |
| c | " | 10 | 30 | 0.14 | 17.60 | 17.74 |
| d | " | 2 | 60 | 0.41 | 15.07 | 15.48 |
| e | " | 5 | 60 | 0.98 | 11.23 | 12.21 |
| f | " | 10 | 60 | 0.23 | 10.55 | 10.78 |
| 3-a | $3CaO \cdot 2SiO_2$ | 2 | 30 | 0.31 | 11.77 | 12.08 |
| b | " | 5 | 30 | 0.24 | 11.54 | 11.77 |
| c | " | 10 | 30 | 0.11 | 10.47 | 10.58 |
| d | " | 2 | 60 | 0.85 | 17.06 | 17.91 |
| e | " | 5 | 60 | 0.62 | 15.21 | 15.83 |
| f | " | 10 | 60 | 0.24 | 13.34 | 13.58 |

Table 2

| Comparative Example No. | Stabilizer | Amount of Stabilizer per 100 parts of PVC (part) | Thermal Decomp. Time (min.) | Free HCl | Extracted HCl | Total Amount of HCl |
| --- | --- | --- | --- | --- | --- | --- |
|  |  |  |  | ($10^{-2}$ mmol) | | |
| 1-a | None | — | 30 | 13.0 | 0.8 | 13.8 |
| b | " | — | 60 | 44.0 | 1.5 | 45.5 |
| 2-a | calcium hydroxide | 2 | 30 | 9.05 | 28.18 | 37.06 |
| b | " | 5 | 30 | 5.74 | 43.23 | 48.97 |
| c | " | 10 | 30 | 3.05 | 58.88 | 61.94 |
| d | " | 2 | 60 | 21.90 | 34.09 | 55.90 |
| e | " | 5 | 60 | 15.38 | 48.03 | 63.41 |
| f | " | 10 | 60 | 9.24 | 63.00 | 72.24 |
| 3-a | calcium carbonate | 2 | 30 | 19.00 | 0.07 | 19.07 |
| b | " | 5 | 30 | 17.22 | 0.00 | 17.22 |
| c | " | 10 | 30 | 13.92 | 0.23 | 14.15 |
| d | " | 2 | 60 | 44.00 | 1.34 | 45.37 |
| e | " | 5 | 60 | 43.86 | 3.05 | 46.91 |
| f | " | 10 | 60 | 42.73 | 4.81 | 47.54 |
| 4-a | calcium silicate hydrates | 2 | 30 | 10.01 | 4.28 | 14.29 |
| b | " | 5 | 30 | 8.41 | 5.27 | 13.68 |
| c | " | 10 | 30 | 0.90 | 12.28 | 13.18 |
| d | " | 2 | 60 | 21.63 | 23.00 | 44.63 |
| e | " | 5 | 60 | 11.35 | 30.03 | 41.38 |
| f | " | 10 | 60 | 2.46 | 39.05 | 42.01 |

As is apparent from the results given Tables 1 and 2 above, in Comparative Example 2, where calcium hydroxide was added to the chlorine-containing resin as a thermal stabilizer, the ability to scavenge free hydrogen chloride generated during the thermal decomposition of the resin was high, but hydrogen chloride in the resin molecules was also positively drawn out to eventually increase the total amount of hydrogen chloride, thereby accelerating deterioration of the chlorine-containing resin as compared with the results of Comparative Example 1 where no stabilizer was used.

In Comparative Example 3, where calcium carbonate was used as a stabilizer, the scavenging ability was too weak to scavenge free hydrogen chloride generated during the decomposition of the chlorine-containing resin and, therefore, the calcium carbonate was also disadvantageous in that the rate of decomposition of the chlorine-containing resin increased. Also, in Comparative Example 4, wherein calcium silicate hydrate obtained by a wet synthesis was employed, the ability to scavenge hydrogen chloride was not sufficient, thereby increasing the rate of decomposition of the resin.

On the contrary, $2CaO.SiO_2$, $3CaO.SiO_2$, and $3CaO.2SiO_2$ employed in Examples 1 to 3 sufficiently scavenged hydrogen chloride generated due to the decomposition of the chlorine-containing resin, and the use of these stabilizers made it possible to prevent hydrogen chloride contained in the chlorine-containing resin molecules from being positively drawn out therefrom, and, as a result, remarkably improved the thermal stability of the chlorine-containing resin.

EXAMPLES 4 and 5

2 parts of each of $2CaO.SiO_2$ and $3CaO.SiO_2$ and 1 part of a hydrocarbon wax lubricant were added to 100 parts of the polyvinyl chloride, and the resulting mixture was uniformly blended using a triturator. The blended powder was then kneaded using a mixing roll set at 200° C for 5 minutes to obtain a sheet which was then subjected to heat-testing using a hot-air oven tester at 190° C for the time as shown in Table 3 to observe the change in the thermal stability and anti-coloring property thereof. The results obtained are shown in Table 3 below.

Similarly, each of calcium hydroxide, calcium carbonate, calcium sulfate and calcium silicate hydrate and the hydrocarbon wax lubricant were added to polyvinyl chloride, and the results are also shown in Table 3 as Comparative Examples 5 to 8.

Table 3

|  | Example No. | | Comparative Example No. | | | |
| --- | --- | --- | --- | --- | --- | --- |
|  | 4 | 5 | 5 | 6 | 7 | 8 |
| Composition (parts by wt.) | | | | | | |
| Polyvinyl chloride | 100 | 100 | 100 | 100 | 100 | 100 |
| $2CaO \cdot SiO_2$ | 2 | | | | | |
| $3CaO \cdot SiO_2$ | | 2 | | | | |
| Calcium hydroxide | | | 2 | | | |
| Calcium carbonate | | | | 2 | | |
| Calcium sulfate | | | | | 2 | |
| Calcium silicate hydrates | | | | | | 2 |
| Lubricant | 1 | 1 | 1 | 1 | 1 | 1 |
| Color of Roll-mixed Sheet | faint yellow | pale yellow | deep red | orange red | reddish brown | orange |
| Color of Roll-mixed Sheet after Heat-testing (190° C) | | | | | | |
| 5 (min.) | yellow | pale yellow | deep red | orange red | reddish brown | orange |
| 10 | yellow | pale yellow | deep red | orange red | reddish brown | orange |
| 15 | yellow | pale yellow | deep red | dark orange | reddish brown | orange |
| 20 | yellow | pale yellow | deep red | dark orange | reddish brown | reddish orange |
| 25 | orange | yellow | deep red | dark orange | reddish brown | reddish orange |
| 30 | orange | yellow | deep red | dark orange | reddish brown | reddish brown |

As is shown in Table 3 above, the color of the roll-mixed sheet having incorporated therein a calcium compound prepared by a dry synthesis was pale yellow to faint yellow, which color underwent substantially no change after heat-testing, whereas the roll-mixed sheets obtained in the Comparative Examples using conventional stabilizers had a color varying from orange to deep red at the time of preparation and, further, the color changed greatly after the heat-testing. As illustrated above, the addition of the calcium silicate compounds according to the present invention was found to impart an improved anti-coloring property to the chlorine-containing resin.

EXAMPLES 6 to 9

5 parts of each of $2CaO \cdot SiO_2$ and $3CaO \cdot SiO_2$, 0.5 parts of calcium stearate and 1 part of a hydrocarbon wax lubricant were added to 100 parts of the polyvinyl chloride to provide blended powders. To an aliquot of each blended powders was further added 0.01 part of dioctyl tin bis-(2-ethylhexylthioglycolic acid ester mercaptide). Each sample was blended using a roll-mixer at 200° C for the times as shown in Table 4, and the anti-coloring property with the passage of time was observed. The results obtained are shown in Table 4 below.

Similarly, calcium hydroxide, calcium carbonate, calcium sulfate or calcium silicate hydrates and the hydrocarbon wax lubricant were added to the polyvinyl chloride, and the resulting blends subjected to the same testing. The results obtained are also shown in Table 4 as Comparative Examples 9 to 12.

Table 4

|  | Example No. | | | | Comparative Example No. | | | |
| --- | --- | --- | --- | --- | --- | --- | --- | --- |
|  | 6 | 7 | 8 | 9 | 9 | 10 | 11 | 12 |
| Composition (parts by weight) | | | | | | | | |
| Polyvinyl chloride | 100 | 100 | 100 | 100 | 100 | 100 | 100 | 100 |
| $2CaO \cdot SiO_2$ | 5 | | 5 | | | | | |
| $3CaO \cdot SiO_2$ | | 5 | | 5 | | | | |
| Calcium hydroxide | | | | | 5 | | | |
| Calcium carbonate | | | | | | 5 | | |
| Calcium silicate Hydrates | | | | | | | 5 | |
| Calcium stearate | 0.5 | 0.5 | 0.5 | 0.5 | 0.5 | 0.5 | 0.5 | 0.5 |
| Dioctyl tin bis-(2-ethylhexyl-thioglycolic acid ester mercaptide) | | | 0.01 | 0.01 | | | | |
| Lubricant | 1 | 1 | 1 | 1 | 1 | 1 | 1 | 1 |
| Color after Roll-mixing (200° C) | | | | | | | | |
| 5 (min.) | yellow | pale yellow | pale yellow | white | dark red | red | reddish-brown | red |
| 10 | yellow | pale yellow | pale yellow | white | dark red | red | reddish-brown | red |
| 15 | yellow | yellow | pale yellow | white | dark red | deep red | dark brown | orange-red |
| 20 | orange-yellow | yellow | pale yellow | white | dark red | reddish-brown | dark brown | deep scarlet |

As is apparent from the results of Comparative Examples 9 to 12 given in Table 4 above, the anti-coloring property of the roll-mixed sheet having incorporated therein the conventional calcium salt in combination with an organic acid salt was not good. All these control sheets began to change their color after only 5 minutes of roll-mixing to red to reddish-brown, and 20 minutes of roll-mixing changed the color to deep scarlet to dark brown. On the other hand, in Examples 6 and 7 wherein the calcium silicate compound was used in combination with an organic acid salt, the anti-coloring property of the roll-mixed sheets was satisfactory. That is, the color of the sheets turned only to pale yellow or yellow in 5 minutes of roll-mixing, and in 20 minutes to orange-yellow or yellow.

Further, as shown by the results obtained in Examples 8 and 9, the use of the calcium silicate compound in combination with an extremely small amount of the organic tin compound was found to remarkably improve the anti-coloring property so that the color of the sheets only turned to white or pale yellow in 5 minutes of roll-mixing, and they kept their color thereafter.

EXAMPLE 10

2 parts of $3CaO \cdot SiO_2$, 1 part of calcium stearate, 0.01 part of dioctyl tin bis-(2-ethylhexylthioglycolic acid ester mercaptide) and 1 part of a hydrocarbon wax lubricant were added to 100 parts of the polyvinyl chloride. The resulting mixture which had been premixed using a triturator for 10 minutes was heat-kneaded using a plastgraph manufactured by Blabender Co., U.S.A., with a kneader type screw. The torque of the kneader was measured under the conditions given below, and the time period from the point at which the torque showed its maximum value followed by reaching the equilibrium point to the point at which the torque again began to rise (initial decomposition) was taken as the thermal resistance time for dynamic thermal stability. The results obtained are shown in Table 5 below.

| Conditions for Detection | |
| --- | --- |
| Amount of samples | 65 g |
| Rate of rotation of screw | 60 r.p.m. |
| Pre-heating time after charging | 5 minutes |
| Temperature at the time of charging | 185° C |

Similarly, the polyvinyl chloride with no additives and the polyvinyl chloride with an organic tin compound and/or an organic acid salt were subjected to the same determination, and the results obtained are also shown in Table 5 as Comparative Examples 13 to 15.

Table 5

| | Ex. 10 | Comparative Ex. 13 | Comparative Ex. 14 | Comparative Ex. 15 |
| --- | --- | --- | --- | --- |
| Composition (parts by weight) | | | | |
| Polyvinyl chloride | 100 | 100 | 100 | 100 |
| $3CaO \cdot SiO_2$ | 2 | — | — | — |
| Calcium stearate | 1 | — | — | 1 |
| Dioctyl tin bis-2-ethylhexyl-thioglycolic acid | 0.01 | — | 0.01 | 0.01 |
| ester mercaptide) | | | | |
| Hydrocarbon Wax Lubricant | 1 | — | 1 | 1 |
| Thermal resistance time (min/sec) | 25.00 | 4.20 | 4.35 | 4.30 |

As is apparent from the above results, when the stabilizer comprising three components according to the present invention was used, the thermal resistance time was found to be 25 minutes, which indicates a remarkable prolongation in comparison with the case of the polyvinyl chloride alone. The thermal resistance time obtained by using the organic tin compound alone or in combination with the organic acid salt was 4 minutes and 35 seconds and 4 minutes and 30 seconds, respectively, indicating that these stabilizers per se could not sufficiently improve the thermal stability of the polyvinyl chloride.

EXAMPLE 11

Each of $CaO \cdot TiO_2$ and $3CaO \cdot TiO_2$ was added to the polyvinyl chloride in an amount of 5 parts per 100 parts of the polyvinyl chloride, and the mixture uniformly blended. 2 g of each of the resulting blends was placed in a glass vessel and the vessel was immersed in a thermostatic tank set at a temperature of 200° C and heated for 60 minutes. Nitrogen gas was then blown into the system at a rate of 130 ml/min., and hydrogen chloride gas present in the system together with nitrogen gas was collected in a bottle containing 100 cc of water. The chlorine ions within the bottle and the metal chlorides formed by reaction with the stabilizer were titrated with a 0.01N silver nitrate solution by a potentiometric titration method to determine the amount of hydrogen chloride which had been released from the polyvinyl chloride. The results obtained are shown in Table 6 below.

For comparison, the polyvinyl chloride with no additives, the polyvinyl chloride having incorporated therein each of calcium oxide and titanium oxide in an amount of 5 parts per 100 parts of the polyvinyl chloride and the polyvinyl chloride having incorporated therein 5 parts of a mixture of calcium oxide and titanium dioxide per 100 parts of the polyvinyl chloride prepared by simply mixing the two components at the same molar ratio (using $3CaO \cdot TiO_2$ and a mere mixture of CaO and $TiO_2$ in the same 3:1 molar ratio ($3CaO + 1TiO_2$)) as that of the compounds used in the present invention were subjected to the same determination. The results obtained are given in Table 6 as Comparative Examples 16 to 20.

Table 6

| | Example No. | | Comparative Example No. | | | | |
| --- | --- | --- | --- | --- | --- | --- | --- |
| | 11-a | 11-b | 16 | 17 | 18 | 19 | 20 |
| Composition (parts by weight) | | | | | | | |
| Polyvinyl chloride | 100 | 100 | 100 | 100 | 100 | 100 | 100 |
| $CaO \cdot TiO_2$ | 5 | — | — | — | — | — | — |
| $3CaO \cdot TiO_2$ | — | 5 | — | — | — | — | — |
| Calcium oxide | — | — | — | 5 | — | — | — |
| Titanium oxide | — | — | — | — | 5 | — | — |
| Mixture of calcium oxide and titanium oxide | — | — | — | — | — | 5 (1:1) | 5 (3:1) |

Table 6-continued

| | Example No. | | Comparative Example No. | | | | |
|---|---|---|---|---|---|---|---|
| | 11-a | 11-b | 16 | 17 | 18 | 19 | 20 |
| (molar ratio, CaO:TiO$_2$) | | | | | | | |
| Amount of HCl Released ($\times 10^{-2}$ mmol) | 37 | 33 | 47 | 55 | 43 | 58 | 53 |
| Color of blended powder after heat-testing | milky yellow | milky yellow | black | dark red | milky deep red | milky deep red | milky deep red |

As is apparent from Table 6 above, in Comparative Example 17 in which only calcium oxide was added and Comparative Examples 19 and 20 in which a mixture of calcium oxide and titanium dioxide was added, the amount of the free hydrogen chloride was larger than that obtained in Comparative Example 16 where the polyvinyl chloride was used without any additives. Only the case where titanium dioxide alone was added to the polyvinyl chloride as in Comparative Example 18 showed a slight improvement over the results in Comparative Example 16. Therefore, the use of these conventional additives tends to accelerate the generation of hydrogen chloride contained in the polyvinyl chloride resin molecules. On the other hand, in Examples 11-a and 11-b the amount of free hydrogen chloride was far less than that detected in Comparative Example 16, and the generation of hydrogen chloride due to thermal decomposition of the resin was remarkedly decreased. In addition, there was observed no adverse influence in that hydrogen chloride was not generated from the polyvinyl chloride resin molecules.

Further, as to the color the blended powder exhibited after heat-testing, it changed to black in Comparative Example 16 wherein no stabilizer was used and milky deep red to dark red in Comparative Examples 17 to 20 wherein one or both of calcium oxide and titanium oxide were used, whereas in Examples 11-a and 11-b according to the present invention, the color only changed to milky yellow, indicating improved thermal stability for a prolonged period of time.

EXAMPLE 12

Each of CaO.Al$_2$O$_3$ and 3CaO.Al$_2$O$_3$ was added to the polyvinyl chloride in an amount of 5 parts per 100 parts of the polyvinyl chloride, and the amount of free hydrogen chloride was determined in each case in the same manner as described in Example 11. The results obtained are shown in Table 7 below.

For comparison, the results obtained by using calcium oxide, aluminum oxide or a mixture thereof are also shown in Table 7 as Comparative Examples 21 to 24.

Table 7

| | Ex. No. | | Comparative Example No. | | | | |
|---|---|---|---|---|---|---|---|
| | 12-a | 12-b | 16 | 21 | 22 | 23 | 24 |
| Composition (parts by weight) | | | | | | | |
| Polyvinyl chloride | 100 | 100 | 100 | 100 | 100 | 100 | 100 |
| CaO . Al$_2$O$_3$ | 5 | — | — | — | — | — | — |
| 3CaO . Al$_2$O$_3$ | — | 5 | — | — | — | — | — |
| Calcium oxide | — | — | — | 5 | — | — | — |
| Aluminum oxide | — | — | — | — | 5 | — | — |
| Mixture of calcium oxide and aluminum oxide (CaO:Al$_2$O$_3$ molar ratio) | — | — | — | — | — | 5 (1:1) | 5 (3:1) |
| Amount of HCl Released ($\times 10^{-2}$ mmol) | 40 | 38 | 47 | 55 | 50 | 58 | 56 |

As is apparent from Table 7 above, the chlorine-containing resin composition according to the present invention prevents the generation of hydrogen chloride from the resin molecules.

EXAMPLE 13

5 parts of each of CaO.TiO$_2$, 3CaO.TiO$_2$, CaO.Al$_2$O$_3$ and 3CaO.Al$_2$O$_3$ and 1 part of calcium stearate were added to 100 parts of the polyvinyl chloride, and the resulting mixture was subjected to the same heat-testing described in Example 11. The results obtained are shown in Table 8 below.

Table 8

| | Example No. | | | | Comparative Ex. 25 |
|---|---|---|---|---|---|
| | 13-a | 13-b | 13-c | 13-d | |
| Composition (parts by weight) | | | | | |
| Polyvinyl chloride | 100 | 100 | 100 | 100 | 100 |
| CaO . TiO$_2$ | 5 | | | | |
| 3CaO . TiO$_2$ | | 5 | | | |
| CaO . Al$_2$O$_3$ | | | 5 | | |
| 3CaO . Al$_2$O$_3$ | | | | 5 | |
| Calcium stearate | 1 | 1 | 1 | 1 | 1 |
| Amount of HCl Released ($\times 10^{-2}$ mmol) | 32 | 27 | 35 | 30 | 66 |
| Color of blended powder after heat-testing | milky yellow | milky yellow | yellow | pale yellow | dark purple |

As is seen from the results given above, the disadvantage that the generation of hydrogen chloride from the polyvinyl chloride resin molecules was accelerated could be alleviated.

EXAMPLE 14

5 parts of each of CaO.TiO$_2$, 3CaO.TiO$_2$, CaO.Al$_2$O$_3$ and 3CaO.Al$_2$O$_3$, 1 part of calcium stearate and 0.1 part of dioctyl tin bis(2-ethylhexylthioglycolic acid ester mercaptide) were added to 100 parts of the polyvinyl chloride. Each of the resulting blended powders was subjected to the same heat-testing as described in Example 11, and the results obtained are shown in Table 9 below.

For comparison, the results obtained in case where only dioctyl tin bis(2-ethylhexylthioglycolic acid ester mercaptide) and calcium stearate were used are also shown in Table 9.

Table 9

| | Example No. | | | | Comparative Ex. 26 |
|---|---|---|---|---|---|
| | 14-a | 14-b | 14-c | 14-d | |
| Composition (parts by weight) | | | | | |
| Polyvinyl chloride | 100 | 100 | 100 | 100 | 100 |
| $CaO \cdot TiO_2$ | 5 | — | — | — | — |
| $3CaO \cdot TiO_2$ | — | 5 | — | — | — |
| $CaO \cdot Al_2O_3$ | — | — | 5 | — | — |
| $3CaO \cdot Al_2O_3$ | — | — | — | 5 | — |
| Calcium stearate | 1 | 1 | 1 | 1 | 1 |
| Dioctyl tin bis(2-ethylhexylthio-glycolic acid ester mercaptide) | 0.1 | 0.1 | 0.1 | 0.1 | 0.1 |
| Amount of HCl Released ($\times 10^{-2}$ mmol) | 16 | 11 | 13 | 9 | 73 |
| Color of blended powder after heat-testing | orange-yellow | yellow | pale yellow | pale yellow | black |

As is apparent from Table 9 above, the disadvantage that the generation of hydrogen chloride was accelerated could be alleviated by using the compounds according to the present invention.

EXAMPLES 15 to 17

250 ml of methanol containing 1 ml of water was placed in a 500 ml volume separating flask equipped with a stirrer, and a solution of 6 g of the organic silicon compound as indicated in Table 10 below, e.g., γ-mercaptopropyl trimethylsilane, was added thereto followed by heating at 60° C to form a homogeneous solution. To the resulting solution was added the calcium silicate compound as indicated in Table 10, e.g., 3CaO.-SiO$_2$ and the mixture was heated at 80° C for 5 hours while stirring, filtered with suction, washed with methanol and dried in vacuo to obtain powders.

Each of the above treated powders was added to the polyvinyl chloride in an amount of 5 parts per 100 parts of the polyvinyl chloride followed by uniformly blending. The blended powder was subjected to the Congo Red test at 200° C based on JIS K6723. The thermal stability test results are shown in Table 10 below.

For comparison, the results obtained in cases where an untreated calcium silicate compound was added and where the polyvinyl chloride alone was used are also given.

Table 10

| | Example No. | | | | | | |
|---|---|---|---|---|---|---|---|
| | 15-a | 15-b | 15-c | 15-d | 15-e | 16 | 17 |
| Composition (parts by weight) | | | | | | | |
| Polyvinyl chloride | 100 | 100 | 100 | 100 | 100 | 100 | 100 |
| Treated calcium silicate compound | 5 | 5 | 5 | 5 | 5 | 5 | 5 |
| (Calcium silicate Compound) | $3CaO \cdot SiO_2$ | $3CaO \cdot SiO_2$ | $3CaO \cdot SiO_2$ | $3CaO \cdot SiO_2$ | $3CaO \cdot SiO_2$ | $2CaO \cdot SiO_2$ | $3CaO \cdot 2SiO_2$ |
| (Treating agent) | (γ-mercaptopropyl trimethoxysilane) | (γ-glycidoxypropyl trimethoxysilane) | (γ-aminopropyl trimethoxysilane) | (γ-methacryloxypropyl trimethoxysilane) | (vinyl trimethoxysilane) | (γ-mercaptopropyl trimethoxysilane) | (γ-mercaptopropyl trimethoxysilane) |
| Untreated calcium silicate compound | — | — | — | — | — | — | — |
| Thermal resistance time (min. sec.) | 18.24 | 24.35 | 21.43 | 18.14 | 19.37 | 10.39 | 15.42 |

| | Comparative Example No. | | | |
|---|---|---|---|---|
| | 27 | 28 | 29 | 30 |
| Composition (parts by weight) | | | | |
| Polyvinyl chloride | 100 | 100 | 100 | 100 |
| Treated calcium silicate compound (Calcium silicate compound) | — | — | — | — |
| (Treating agent) | — | — | — | — |
| Untreated calcium silicate compound | — | $3CaO \cdot SiO_2$ 5 | $2CaO \cdot SiO_2$ 5 | $3CaO \cdot 2SiO_2$ 5 |
| Thermal resistance time (min. sec.) | 1.30 | 9.45 | 7.28 | 9.05 |

As will be seen from Table 10, the thermal resistance time in each case where the treated calcium silicate compound was added according to the present invention was remarkably extended in comparison with the cases where untreated calcium silicate compounds were added as in Comparative Examples 27 to 30.

EXAMPLES 18 to 20

2 parts of the treated calcium silicate compound prepared in the same manner as described in Example 15 and 1 part of calcium stearate were added to 100 parts of the polyvinyl chloride followed by blending at room temperature using a triturator or a mortor, and each blended powder was subjected to the same Congo Red test as described in Example 15. The results obtained are shown in Table 11 below.

For comparison, thermal stability test results using an untreated calcium silicate compound in combination with calcium stearate are also shown in Table 11 as Comparative Examples 31 to 33.

Table 11

| | Example No. | | | | | | |
|---|---|---|---|---|---|---|---|
| | 18-a | 18-b | 18-c | 18-d | 18-e | 19 | 20 |

Table 11-continued

| Composition (parts by weight) | | | | | | | |
|---|---|---|---|---|---|---|---|
| Polyvinyl chloride | 100 | 100 | 100 | 100 | 100 | 100 | 100 |
| Treated calcium silicate compound | 2 | 2 | 2 | 2 | 2 | 2 | 2 |
| (Calcium silicate compound) | 3CaO . SiO$_2$ | 3CaO . SiO$_2$ | 3CaO . SiO$_2$ | 3CaO . SiO$_2$ | 3CaO . SiO$_2$ | 2CaO . SiO$_2$ | 3CaO . 2SiO$_2$ |
| (Treating agent) | (γ-mercaptopropyl trimethoxysilane) | (γ-glycidoxypropyl trimethoxysilane) | (γ-aminopropyl trimethoxysilane) | (γ-methacryloxypropyl trimethoxysilane) | (vinyl trimethoxysilane) | (γ-mercaptopropyl trimethoxysilane) | (γ-mercaptopropyl trimethoxysilane) |
| Untreated calcium silicate compound | — | — | — | — | — | — | — |
| Calcium stearate | 1 | 1 | 1 | 1 | 1 | 1 | 1 |
| Thermal resistance time (min. sec.) | 25.10 | 36.17 | 38.02 | 25.31 | 25.44 | 23.36 | 45.11 |

| | Comparative Example No. | | |
|---|---|---|---|
| | 31 | 32 | 3 |
| Composition (parts by weight) | | | |
| Polyvinyl chloride | 100 | 100 | 100 |
| Treated calcium silicate compound | — | — | — |
| (Calcium silicate compound) | — | — | — |
| (Treating agent) | — | — | — |
| Untreated calcium silicate compound | 3CaO . SiO$_2$ 2 | 2CaO . SiO$_2$ 2 | 3CaO . 2SiO$_2$ 2 |
| Calcium stearate | 1 | 1 | 1 |
| Thermal resistance time (min. sec.) | 18.03 | 12.46 | 16.55 |

As is apparent from Table 11 above, the thermal resistance time in each case where the treated calcium silicate compound was used in combination with calcium stearate was highly extended in comparison with the cases where an untreated calcium silicate compound in combination with calcium stearate was used, as in Comparative Examples 31 to 33.

EXAMPLES 21 to 23

A powder blend was prepared by uniformly mixing 100 parts of the polyvinyl chloride, 2 parts of the treated calcium silicate compound prepared in the same manner as described in Example 15, 1 part of calcium stearate, 2 parts of dimethyl tin bis(2-ethylhexylthioglycolate) and 1.5 parts of a hydrocarbon wax lubricant. Each blended powder was heat-kneaded using a plastgraph equipped with a kneader-type screw manufactured by Blabender Co., and the torque of the kneader was measured under the conditions given below. The time period from the point at which the torque showed its maximum value followed by reaching the equilibrium point to the point at which the torque again began to rise (which indicated initial decomposition) was taken as the dynamic thermal resistance time. The results obtained are shown in Table 12.

| Conditions for Torque Detection | |
|---|---|
| Amount of samples | 70 g |
| Rate of rotation of screw | 60 r.p.m. |
| Pre-heating time after charging samples | 5 minutes |
| Temperature set at the time of charging | 185° C |

Table 12

| | Example No. | | | | | | |
|---|---|---|---|---|---|---|---|
| | 21-a | 21-b | 21-c | 21-d | 21-e | 22 | 23 |
| Composition (parts by weight) | | | | | | | |
| Polyvinyl chloride | 100 | 100 | 100 | 100 | 100 | 100 | 100 |
| Treated calcium silicate compound | 2 | 2 | 2 | 2 | 2 | 2 | 2 |
| (Calcium silicate compound) | 3CaO . SiO$_2$ | 3CaO . SiO$_2$ | 3CaO . SiO$_2$ | 3CaO . SiO$_2$ | 3CaO . SiO$_2$ | 2CaO . SiO$_2$ | 3CaO . 2SiO$_2$ |
| (Treating agent) | (γ-mercaptopropyl trimethoxy- | (γ-glycidoxypropyl trimethoxy- | (γ-aminopropyl trimethoxy- | (γ-methacryloxypropyl methoxysilane) | (vinyl trimethoxysilane) | (γ-mercaptopropyl trimethoxy- | (γ-mercaptopropyl trimethoxy- |

Table 12-continued

|  | silane) | silane) | silane) |  |  | silane) | silane) |
|---|---|---|---|---|---|---|---|
| Untreated calcium silicate compound | — | — | — | — | — | — | — |
| Calcium stearate | 1 | 1 | 1 | 1 | 1 | 1 | 1 |
| Dimethyl tin bis(2-ethyl-hexylthioglycolate) | 2 | 2 | 2 | 2 | 2 | 2 | 2 |
| Thermal resistance time (min. sec.) | 48 | 56 | 45 | 55 | 60 | 25.23 | 47.33 |

|  | Comparative Example No. | | | | |
|---|---|---|---|---|---|
|  | 34 | 35 | 36 | 37 | 38 |
| Composition (parts by weight) | | | | | |
| Polyvinyl chloride | 100 | 100 | 100 | 100 | 100 |
| Treated calcium silicate compound (Calcium silicate compound) | — | — | — | — | — |
| (Treating agent) | — | — | — | — | — |
| Untreated calcium silicate compound | — | 2 ($3CaO . SiO_2$) | 2 ($3CaO . SiO_2$) | 2 ($2CaO . SiO_2$) | 2 ($3CaO . 2SiO_2$) |
| Calcium stearate | 1 | 1 | 1 | 1 | 1 |
| Dimethyl tin bis(2-ethyl-hexylthioglycolate) | 2 | — | 2 | 2 | 2 |
| Thermal resistance time (min. sec.) | 29 | 18 | 39 | 21.05 | 44.58 |

As is apparent from the results in Table 12 above, the thermal resistance time in each case where the treated calcium silicate compound, calcium stearate and the organic tin compound was used according to the present invention was remarkably extended in comparison with the results obtained in Comparative Examples 34 to 38, wherein an untreated calcium silicate compound was used in combination with calcium stearate and the organic tin compound.

EXAMPLE 24

A powder blend was prepared in the same manner as described in Example 21 but using the treated calcium silicate compound in an amount of 5 parts per 100 parts of the polyvinyl chloride, and the system was roll-mixed using 6 inch rolls set at a temperature of 600° C for 10 minutes to prepare a sheet. Cut pieces of the resulting sheet were stacked to form a laminate, and the resulting laminate heated at 195° C under a pressure of 200 Kg/cm² for 10 minutes to provide a laminated plate having a thickness of 2 mm. The mechanical properties of the resulting laminated plate were determined according to JIS K6745, and the results obtained are shown in Table 13 below.

For comparison, the results obtained using an untreated calcium silicate compound in combination with calcium stearate and the organic tin compound are also shown.

Table 13

|  | Example No. | | | | | Comparative Example 39 |
|---|---|---|---|---|---|---|
|  | 24-a | 24-b | 24-c | 24-d | 24-e | |
| Composition (parts by weight) | | | | | | |
| Polyvinyl chloride | 100 | 100 | 100 | 100 | 100 | 100 |
| Treated calcium silicate compound | 5 | 5 | 5 | 5 | 5 | — |
| (Calcium silicate compound) | $3CaO . SiO_2$ | $3CaO . SiO_2$ | $3CaO . SiO_2$ | $3CaO . SiO_2$ | $3CaO . SiO_2$ | |
| (Treating agent) | (γ-mercapto-propyl trimethoxy-silane) | (γ-glycidoxy-propyl trimethoxy-silane) | (γ-aminopropyl trimethoxy-silane) | (γ-methacryloxy-propyl trimethoxy-silane) | (vinyl trimethoxy-silane) | — |
| Untreated calcium silicate compound ($3CaO . SiO_2$) | — | — | — | — | — | 5 |
| Calcium stearate | 1 | 1 | 1 | 1 | 1 | 1 |
| Dimethyl tin bis(2-ethylhexyl-thioglycolic | 2 | 2 | 2 | 2 | 2 | 2 |

Table 13-continued

|  | Example No. | | | | | Comparative |
|---|---|---|---|---|---|---|
|  | 24-a | 24-b | 24-c | 24-d | 24-e | Example 39 |
| acid)ester mercaptide |  |  |  |  |  |  |
| Hydrocarbon wax lubricant | 1.5 | 1.5 | 1.5 | 1.5 | 1.5 | 1.5 |
| Tensile strength (Kg/cm$^3$) | 558 | 553 | 547 | 548 | 547 | 529 |
| Elongation (%) | 122 | 127 | 118 | 103 | 110 | 69 |
| Impact strength (Kg·cm/cm$^2$) | 7.1 | 7.0 | 6.2 | 7.8 | 6.8 | 5.4 |

As is apparent from Table 13 above, it was found that the mechanical properties (tensile strength, elongation and impact strength) of the laminated plates prepared according to the present invention are far superior to those obtained in Comparative Example 39, wherein the untreated calcium silicate compound was added in combination with calcium stearate and the organic tin compound.

EXAMPLE 25

5 g of each of the treated calcium silicate compounds prepared as described in Example 15 was thinly spread in a glass container followed by standing for 1 month. Stability with the passage of time was determined from the % increase in weight of the sample, and the results obtained are shown in Table 14 below.

Table 14

|  | Example No. | | | | | Comparative |
|---|---|---|---|---|---|---|
|  | 25-a | 25-b | 25-c | 25-d | 25-e | Example 40 |
| Composition (g) |  |  |  |  |  |  |
| Treated calcium silicate | 5 | 5 | 5 | 5 | 5 | — |
| (Calcium silicate compound) | 3CaO . SiO$_2$ | 3CaO . SiO$_2$ | 3CaO . SiO$_2$ | 3CaO . SiO$_2$ | 3CaO . SiO$_2$ |  |
| (Treating agent) | (γ-mercaptopropyl trimethoxysilane) | (γ-glycidoxypropyl trimethoxysilane) | (γ-aminopropyl timethoxysilane) | (γ-methacryloxypropyl trimethoxysilane) | (vinyl trimethoxysilane) |  |
| Untreated calcium silicate (3CaO . SiO$_2$) | — | — | — | — | — | 5 |
| Weight after 1 month (g) | 5.03 | 5.015 | 5.06 | 5.035 | 5.03 | 5.594 |
| % increase | 0.6 | 0.3 | 1.2 | 0.7 | 0.6 | 11.9 |

As is apparent from Table 14 above, the % increase in weight of the treated calcium silicate compound as used in the present invention was extremely small, establishing remarkably improved stability with the passage of time. This can be considered due to the fact that the outer surface of the calcium silicate particles is not directly exposed to air as they were treated with the organic silicon compound, and therefore the absorption of water or carbon dioxide present in the air can be prevented, whereby stability with the passage of time can be retained.

While the invention has been described in detail and with reference to specific embodiments thereof, it will be apparent to one skilled in the art that various changes and modifications can be made therein without departing from the spirit and scope thereof.

What is claimed is:

1. A chlorine-containing resin composition comprising a chlorine-containing resin selected from the group consisting of polyvinyl chloride, polyvinylidene chloride, a vinyl chloridevinylidene chloride copolymer, a vinyl chloride-vinyl acetate copolymer, a vinyl chloride-ethylene copolymer, a chlorinated polyvinyl chloride and chlorinated polyethylene and at least one calcium compound selected from the group consisting of CaO.TiO$_2$, 2CaO.TiO$_2$, 3CaO.TiO$_2$, CaO.Al$_2$O$_3$, 2CaO.Al$_2$O$_3$, 3CaO.Al$_2$O$_3$, CaAl$_2$O$_4$, CaB$_2$O$_6$, Ca$_7$MgAl$_{10}$O$_{23}$, CaNb$_2$O$_6$, CaTa$_2$O$_6$, CaTiO$_3$, CaZrO$_3$, CaZrTi$_2$O$_7$, 2CaO.SiO$_2$, 3CaO.SiO$_2$ or 3CaO.2SiO$_2$ wherein said calcium compound is present in said composition in an amount of about 0.5 to about 20 parts by weight per 100 parts by weight of said chlorine-containing resin.

2. The composition according to claim 1 further comprising an organic acid salt as a stabilizer.

3. The composition according to claim 1 further comprising an organic tin compound as a stabilizer.

4. The composition according to claim 1 further comprising an organic acid salt and an organic tin compound as stabilizers.

5. The composition according to claim 1, wherein said calcium compound has a particle size less than about 60 mesh.

6. The composition according to claim 2, wherein the calcium compound is present in an amount of about 0.5 to about 20 parts by weight and the organic acid salt is present in an amount of less than about 5 parts by weight per 100 parts by weight of the chlorine-containing resin.

7. The composition according to claim 4, wherein the calcium compound is present in amount of about 0.5 to about 20 parts by weight, the organic acid salt is present in an amount of less than about 5 parts by weight and the organic tin compound is present in an amount of less than about 3 parts by weight per 100 parts by weight of the chlorine-containing resin.

8. The composition according to claim 2, wherein said organic acid salt is a lithium, sodium, magnesium, calcium, strontium, barium or aluminum salt.

9. The composition according to claim 8, wherein said organic acid salt is a salt of a monocarboxylic acid having 2 to 22 carbon atoms, a dicarboxylic acid monoalkyl ester having 3 to 22 carbon atoms in which the alkyl moiety thereof has 1 to 4 carbon atoms, an unsaturated dicarboxylic acid monoalkyl ester having 10 to 22 carbon atoms in which the alkyl moiety thereof has 1 to 4 carbon atoms, a monoaromatic monocarboxylic acid, a monoaromatic dicarboxylic acid monoalkyl ester having 10 to 22 carbon atoms in which the alkyl moiety thereof has 1 to 4 carbon atoms and a thiocarboxylic acid.

10. The composition according to claim 2, wherein said organic acid salt is a sodium, magnesium or calcium salt of propionic acid, 2-ethylhexoic acid, 12-hydroxystearic acid, gluconic acid, sorbic acid, glycerolic acid, rosic acid, benzoic acid, a higher fatty acid having 8 to 32 carbon atoms and mixtures thereof.

11. The composition according to claim 2, wherein said organic acid salt is calcium stearate.

12. The composition according to claim 3, wherein said organic tin compound contains alkyl or aryl groups each having nine or less carbon atoms.

13. The composition according to claim 3, wherein said organic tin compound is selected from the group consisting of dibutyl tin laurate, dibutyl tin distearate, dibutyl tin dinonylate, tribenzyl tin laurate, dibutyl tin maleate, dioctyl tin maleate polymer, dioctyl tin maleate, dioctyl tin laurate and dioctyl tin bis-(2-ethylhexylthioglycolic acid ester mercaptide).

14. The composition according to claim 1, wherein said compounds $2CaO.SiO_2$, $3CaO.SiO_2$ and $3CaO.2SiO_2$ have an organic silicon compound chemically bonded thereon of the formula $$RSiX_3$$

wherein R is a functional group and X is a halogen atom, an alkoxy group or an acetoxy group.

15. The composition according to claim 14, wherein said functional group is selected from the group consisting of a vinyl group, a methacryloxy group, an amino group, a mercapto group, a glycidoxy group or a haloalkyl group having 1 to 5 carbon atoms.

16. The composition according to claim 1, wherein said compounds $2CaO.SiO_2$, $3CaO.SiO_2$, and $3CaO.2SiO_2$ have an anhydride structure and are obtained by a dry synthesis method.

17. The composition according to claim 5, wherein said calcium compound has a particle size less than 200 mesh.

* * * * *

UNITED STATES PATENT AND TRADEMARK OFFICE
CERTIFICATE OF CORRECTION

PATENT NO. : 4,052,350
DATED : October 4, 1977
INVENTOR(S) : TOMOO SHIOHARA ET AL It is certified that error appears in the above-identified patent and that said Letters Patent are hereby corrected as shown below:

Under the title "FOREIGN APPLICATION PRIORITY DATA", delete the line reading "Nov. 27, 1974 Japan ................. 49-137509".

Signed and Sealed this

Sixth Day of June 1978

[SEAL]

Attest:

RUTH C. MASON
*Attesting Officer*

DONALD W. BANNER
*Commissioner of Patents and Trademarks*